United States Patent Office 3,422,165
Patented Jan. 14, 1969

3,422,165
ISOCYANATE AND ISOTHIOCYANATE COMPOSITIONS AND POLYURETHANES THEREOF
Thomas K. Brotherton and John Smith, Jr., Charleston, W. Va., assignors to Union Carbide Corporation, a corporation of New York
No Drawing. Filed Dec. 8, 1964, Ser. No. 416,889
U.S. Cl. 260—859   33 Claims
Int. Cl. C08g 41/04; C08f 45/44; C08f 45/48

ABSTRACT OF THE DISCLOSURE

A complex composition is produced and claimed which is a polymer/organic isocyanato compound complex. The complex is produced by the in situ free radical catalyzed polymerization of an ethylenically unsaturated monomer in the organic isocyanato compound. The complexes react with polyesters and/or polyethers having reactive hydrogen atoms to produce urethane polymers; they are also useful as adhesive, coatings and films.

---

This invention relates to polymer/organic isocyanate or isothiocyanate complex compositions and to polyurethanes produced therewith.

In accord with the instant invention, it has been found that liquid, reactive complexed compositions can be produced by the polymerization of at least one polymerizable monomer in non-polymerizable low molecular weight organic iso-[thio]-cyanates; i.e., isocyanates or isothiocyanates that are free of the polymerizable aliphatic ethylenic unsaturation of the type $>C=C<$. While the discussion is based on isocyanates it is equally applicable to the isothiocyanates and it is intended to include them within the scope of this invention. It has also been found that the reactive compositions referred to can be used to produce polyurethane compositions, by the conventional well-known procedures, by reaction thereof with compounds which contain reactive hydrogen atoms as determined according to the Zerewitinoff test described by Wohler in the Journal of the American Chemical Society, vol. 48, p. 3181 (1927).

In the instant invention, polymerizable monomers are polymerized in an organic isocyanate to produce a polymer/organic isocyanate complex composition. These latter compositions are per se useful as adhesives, as protective coatings on surfaces, to produce films, etc., and they can also be further reacted with a polyester or a polyether having reactive hydrogen atoms to produce a polyurethane, polyurea, etc.

The polymer/organic isocyanate complex compositions can contain from 1 to about 90 weight percent, or more, of the polymerizable vinyl monomer polymerized therein. Preferably these compositions contain from about 5 to about 75 weight percent and more preferably from about 10 to about 50 weight percent vinyl monomer polymerized therein.

The complexes are generally pourable viscous liquids; though in some rare instances in which the polymer content is the major portion of the composition the composition may barely flow and be almost solid-like in its properties. This, however, does not affect its utility in any manner but only poses problems in handling since heating may be needed to enable it to flow more readily.

The liquid nature of the polymer/organic isocyanate compositions of this invention was unexpected and unobvious since attempts to dissolve the pre-formed polymers in the organic isocyanates normally resulted in slurries or suspensions of the polymer in the organic isocyanate and the preparation of liquid solutions had not previously been achieved. The possibility exists that some interaction does occur between the monomers and the organic isocyanates, such as by grafting, but this has not yet been established with certitude. However, whether or not the components react with each other to produce graft polymers is immaterial since the compositions produced herein are different in kind from known compositions and incapable of production by any other known procedures. The presence of the isocyanato radical in the compositions makes them ideally suitable for use in the polyurethane field.

The polymer/organic isocyanate compositions are produced by polymerizing the monomers in the organic isocyanate at a temperature of from about 0° C. to about 250° C. in the presence of a free radical catalyst known to be suitable for the polymerization of ethylenically unsaturated monomers. Preferably, however, the temperature is from about 20° C. to about 150° C. The polymerization can be carried out at subatmospheric, atmospheric or super-atmospheric conditions. It is well known to those skilled in the polymerization art that the particular conditions of temperature, pressure and time to be employed in a specific reaction are dependent on the monomer to be polymerized and the catalyst selected; it is also well known that the isocyanato group is highly reactive.

The catalyst concentration can vary from about 0.001 to about 5 percent by weight based on the polymerizable monomer. The free radical producing catalysts are well known and illustrative thereof are the peroxides such as hydrogen peroxide, dibenzoyl peroxide, acetyl peroxide, benzoyl hydroperoxide, t-butyl hydroperoxide, di-t-butyl peroxide, lauroyl peroxide, butyryl peroxide, dicumyl peroxide and the like; azo compounds such as azo-bis-isobutyronitrile and the like; the per compounds such as the persulfates, percarbonates, perborates, etc., for example, persuccinic acid, diisopropyl peroxydicarbonate, t-butyl perbenzoate, di-t-butyl diperphthalate, peracetic acid, and the like, etc.

The polymerization can, if desired, be carried out with an inert organic solvent present. The suitable inert solvents are preferably those which do not interfere with the polymerization reaction and which do not react with either the polymerizable monomer or the organic isocyanate. Suitable solvents include benzene, toluene, ethyl acetate, acetonitrile, dichlorobenzene, hexane, heptane, dibutyl ether, naphthalene, cyclohexane, dioxane, acetone, methyl isobutyl ketone, N,N-dimethylformamide, N,N-dimethylacetamide, and the like.

The polymerizable monomers used to produce the polymer/organic isocyanate compositions of this invention are preferably those monomers which are free of reactive hydrogen atoms as determined according to the Zerewitinoff test and which will not react with the isocyanato group of the isocyanate. These monomers can be used singly or in combinations of two or more and are characterized by the presence therein of at least one polymerizable aliphatic ethylenic unsaturated group of the type $>C=C<$. These monomers are well known in the art and include the hydrocarbon monomers such as butadiene, isoprene, 1,4-pentadiene, 1,6-hexadiene, 1,7-octadiene, styrene, alpha-methylstyrene, methylstyrene, dimethylstyrene, ethylstyrene, isopropylstyrene, butylstyrene, phenylstyrene, cyclohexylstyrene, benzylstyrene, and the like; substituted styrenes such as chlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as methyl acrylate, ethyl acrylate, allyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alpha - chloroacrylate, ethyl alpha-ethoxyacrylate, methyl alpha - acetaminoacrylate, butyl acrylate, 2-ethylhexyl acrylate, phenyl acrylate, phenyl methacrylate, alpha-chloroacrylonitrile, N,N-dimethylacrylamide, N,N - dibenzylacrylamide, N - butylacrylamide, methacrylyl formamide, and the like; the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2 - butoxyethyl ether, 3,4 - dihydro - 1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, vinyl isocyanate, allyl isocyanate, bis(2-isocyanatoethyl) fumarate, dimethyl maleate, and the like. Any of the known polymerizable monomers can be used and the compounds listed above are illustrative and not restrictive of the monomers suitable for use in this invention.

Illustrative examples of the suitable low molecular weight isocyanates and isothiocyanates which can be employed to product the polymer/iso-[thio]-cyanate compositions of this invention are phenyl isocyanate, phenyl isothiocyanate, octyl isocyanate, hexyl isothiocyanate, tolyl isocyanate, naphthyl isocyanate, ethyl isocyanate, and similar monoiso-[thio]-cyanates; ethylene diisocyanate, trimethylene diisocyanate, tetramethylene diisocyanate, pentamethylene diisocyanate, hexamethylene diisocyanate, etc.; and the corresponding diisothiocyanates; alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates, and diisothiocyanates, such as ethylidine diisocyanate, butylidine diisocyanate and ethylidine diisothiocyanate; cycloalkylene diisocyanates and diisothiocyanates, such as cyclopentylene - 1,3 - diisocyanate, cyclohexylene-1,2-diisocyanate, cyclohexylene-1,3-diisocyanate, cyclohexylene - 1,4-diisocyanate, and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene-1,3-diisocyanate, bis(4-isocyanatophenyl)methane, bis(3 - methyl-4-isocyanatophenyl)methane, 4,4'-diphenylpropane diisocyanate, or xylylene-1,4-diisothiocyanate; the polyisocyanates, disclosed in U.S. Patent No. 2,683,730, as well as the polyisocyanates listed in the publication of Siefken, Annalen, 562, pages 122–135 (1949). Also included are durylene diisocyanate, 4,4',4''-tris(isocyanatophenyl)methane, 3,10-diisocyanatotricyclo[5.2.1.0$^{2,6}$]decane, bis(2 - isocyanatoethyl)carbonnate, and the like.

It is obvious that after the polymer/iso-[thio]-cyanate composition has been produced it can be further diluted by the addition thereto of an additional amount of any isocyanate or isothiocyanate in order to adjust the concentration of the polymer in the composition to the desired concentration. The term "iso-[thio]-cyanate" is used herein for convenience as the generic term to represent both isocyanate (—NCO) and isothiocyanate (—NCS) compounds.

As previously indicated, the polymer/iso-[thio]-cyanate compositions can be used to produce polyurethanes. The polyurethanes are produced by conventional procedures by reacting the polymer/iso-[thio]-cyanate compositions with a compound containing a reactive hydrogen atom such as a polyol, a polyether polyol, a polyester, etc., as is known in the art. The compounds suitable for producing the polyurethane can be a hydroxyl-terminated polyester, a polyhydroxyalkane, a polyphenol, a polyoxyalkylene polyol, or the like. Among the polyols which can be employed are one or more polyols from the following classes of compositions, alone or in admixture, known to those skilled in the polyurethane art.

(a) Polyhydroxyalkanes;
(b) Hydroxyl-terminated polyesters;
(c) Alkylene oxide adducts of polyhydroxyalkanes;
(d) Trialkanolamines and alkylene oxide adducts thereof;
(e) Alcohols derived from mono- and polyamines by addition of alkylene oxides;
(f) Non-reducing sugars and sugar derivatives and alkylene oxide adducts thereof;
(g) Alkylene oxide adducts of aromatic amine/phenol/aldehyde condensation products;
(h) Alkylene oxide adducts of phosphorus and polyphosphorus acids;
(i) Polyphenols and alkylene oxide adducts thereof;
(j) Polytetramethylene glycols, and the like.

Illustrative polyhydroxyalkanes are ethylene glycol, propylene glycol, hexylene glycol, 1,2,6 - hexanetriol, 1,5-pentanediol, 2-ethyl-1,3-hexanediol, 2-methyl-2-ethyl-1,3-propanediol, 2,2'-dimethyl-1,3-butanediol, glycerol, pentaerythritol, and the like.

Illustrative hydroxyl-terminated polyesters are those which are prepared by polymerizing a lactone in the presence of an active hydrogen-containing starter as disclosed in U.S. Patent No. 2,914,556.

Illustrative alkylene oxide adducts of polyhydroxyalkanes include, among others, the alkylene oxide adducts of ethylene glycol, propylene glycol, 1,3-dihydropropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. Two particularly preferred classes of alkylene oxide adducts of polyhydroxyalkanes are the ethylene oxide, propylene oxide, butylene oxide, or mixtures thereof, adducts of dihydroxyalkanes and of trihydroxyalkanes. The preferred class of alkylene oxide adducts of dihydroxyalkanes contemplated are the polyoxyalkylene glycols, such as diethylene glycol, triethylene glycol, tetraethylene glycol, dipropylene glycol, tripropylene glycol, tetrapropylene glycol, dibutylene glycol, high molecular weight polyoxyethylene glycols, high molecular weight polyoxypropylene glycols, mixed ethylene-propylene glycols, mixed polyoxyethylene-polyoxyproplene glycols, and the like.

Another useful class of polyols which can be employed are the trialkanolamines and the alkylene oxide adducts thereof. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Still another useful class of polyols which can be employed are the alkylene oxide adducts of mono- and polyamines. The mono- and polyamines are preferably reacted with alkylene oxides having 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, the naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N' - tetrakis(2 - hydroxyethyl)ethylenediamine, N,N,N',N' - tetrakis(2-hydroxypropyl)ethylenediamine, N,N,N',N'',N''-pentakis(2-hydroxypropyl)diethylenetriamine, phenyldiisopropanolamine and higher alkylene oxide adducts of aniline, and the like. Others which deserve particular mention are the alkylene oxide adducts of aniline or substituted aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. 3,073,788.

A still further useful class of polyols is the polyphenols, and preferably the alkylene oxide adducts thereof wherein the alkylene oxides have from 2 to 4 carbon atoms. Among the polyphenols which are contemplated are found, for example, bisphenol A, bisphenol F, condensation products of phenol and formaldehyde, the novolac resins, condensation products of various phenolic compounds and acrolein; the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenol)ethanes, and the like.

Another desirable class of polyols is the alkylene oxide adducts, preferably the ethylene oxide, 1,2-epoxypropane, epoxybutane, and mixtures thereof, adducts of aromatic amine/phenol/aldehyde condensation products. The condensation products are prepared by condensing an aromatic amine, for instance aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide if desired, to produce the polyols. The propylene oxide and mixed propylene-ethylene oxide adducts of aniline/phenol/formaldehyde condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, the polymetaphosphoric acids, and the like are desirable for use in this connection.

Another useful class of polyols is the polytetramethylene glycols, which are prepared by polymerizing tetrahydrofuran in the presence of an acidic catalyst.

The polyols employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{m.w.}$$

where:

OH=hydroxyl number of the polyol
$f$=functionality, that is, average number of hydroxyl groups per molecule of polyol
m.w.=molecular weight of the polyol The exact polyol employed depends upon the end-use of the polyurethane product to be produced. For example, in the case of foamed reaction products, the molecular weight or the hydroxyl number is selected properly to result in flexible, semi-flexible, elastomeric, or rigid foams. The above polyols preferably possess a hydroxyl number of from about 200 to about 1000 when employed in rigid foam formulations, from about 50 to about 150 for semi-flexible foams, and from about 40 to about 70 or more when employed in flexible foam formulations. Such limits are not intended to be restrictive, but are merely illustrative of the large number of possible combinations of the above polyol coreactants.

The amount of polyisocyanate employed is dependent, in part, upon such factors as the nature of the reactants, the nature of the end-use for the polyurethane product, and the like. In general, however, the total isocyanate equivalent to total reactive hydrogen equivalent (i.e, total equivalent of alcoholic hydroxyl plus water, if water is employed in the formulation) is ordinarily such as to provide enough isocyanate equivalents to react with all reactive hydrogen equivalents present. Preferably, the ratio of isocyanate equivalents to reactivate hydrogen equivalents is about 1.0 to 1.1 —NCO equivalents per reactive hydrogen equivalent.

One can also use as the polyol component in producing the polyurethanes, a polymer/polyol composition in which the polymer has been produced in situ in the polyol by polymerization of the polymerizable monomer in the polyol. These compositions are now known and can be readily produced in a similar manner to that described herein using any of the polymerizable monomers and polyols disclosed herein. Polyol A is the 1,2-propylene oxide adduct of glycerol, having an average molecular weight of about 3,000. Illustrative of such polymer/polyol compositions are:

polyacrylonitrile/Polyol A
polymethyl methacrylate/Polyol A
poly(methyl methacrylate/ethyl acrylate)/Polyol A
polyisoprene/Polyol A
poly(butadiene/styrene)/Polyol A
polyvinyl chloride/Polyol A
polyvinylidene chloride/Polyol A
poly(acrylonitrile/vinylidene chloride)/Polyol A
poly(acrylonitrile/vinylidene chloride/vinyl chloride)/ Polyol A
polyacrylonitrile/tris(propylene glycol) phosphate, average molecular weight about 3,000
polyacrylonitrile/50/50 adduct of 1,2-propylene oxide and 1,2-butylene oxide with glycerol, average molecular weight about 2,500
polyacrylonitrile/poly-1,4-butylene oxide, average molecular weight about 3,000
polyacrylonitrile/polyester polyol of equimolar mixture of methyl epsilon-caprolactone and epsilon-caprolactone to trimethylol ethane
polyacrylonitrile/adduct of 1,2-propylene oxide to triethanolamine, average molecular weight about 3,000
polyacrylonitrile/1,2-propylene oxide adduct of alpha-methyl glucoside
poly(2-ethylhexyl acrylate)/polypropylene glycol, average molecular weight about 2,000 (Polyol B)

poly(styrene/2-ethylhexyl acrylate)/Polyol B
poly(styrene/2-ethylhexyl acrylate/methyl methacrylate)/Polyol B, and the like.

The polyurethane products produced by this invention can be utilized in the form of surface coatings, elastomers, for molding, in foamed products, or the like. When surface coatings are being prepared, either the quasi-prepolymer or the prepolymer technique is usually employed to prepare the polyurethane product. When elastomers are being prepared, the quasi-prepolymer technique is preferred, and when foamed products are being prepared, either the one-shot or the quasi-prepolymer technique can be employed. Each of these techniques is well known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2,-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2-trifluoroethane, 2 - chloro-1,1,1,2,3,3,4,4,4-nonafluorobutane, hexafluorocyclobutene, and octofluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes the thermally unstable compounds which liberate gases upon heating, such as N,N′-dimethyl-N,N′-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

Catalysts can be employed in the reaction mixture for accelerating the isocyanate-reactive hydrogen reaction. Such catalysts include a wide variety of compounds, for example:

(a) tertiary amines such as trimethylamine, triethylamine, N-methylmorpholine, N-ethylmorpholine, N,N-dimethylbenzylamine, N,N - dimethylethanolamine, N,N,N′,N′-tetramethyl-1,3-butanediamine, triethanolamine, 1,4-diazabicyclo[2.2.2]octane, and the like;
(b) tertiary phosphines such as trialkylphosphines, dialkylbenzylphosphines, and the like;
(c) strong bases such as alkali and alkaline earth metal hydroxides, alkoxides, and phenoxides;
(d) acidic metal salts of strong acids such as ferric chloride, stannic chloride, stannous chloride, antimony trichloride, bismuth nitrate and chloride, and the like;
(e) chelates of various metals such as those which can be obtained from acetylacetone, benzoylacetone, trifluoroacetyl acetone, ethyl acetoacetate, salicylaldehyde, cyclopentanone-2-carboxylate, acetylacetoneimine, bis-acetylacetonealkylene-diimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;
(f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)-alkanols, such as well known chelates of titanium obtained by said or equivalent procedures;
(g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;
(h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltinbis(4 - methylaminobenzoate), dibutyltin-bis(6 - methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltinbis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

It is also within the scope of the invention to employ small amounts, e.g. about 0.001% to 5.0% by weight, based on the total reaction mixture of an emulsifying agent such as polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers.

The polyurethanes produced in this invention have exceptional load-bearing ability and tensile properties. Many of the flexible foams have been found to have load-bearing properties similar to those properties usually associated with semi-flexible foams thus making it possible to use the flexible foams of this invention in those applications where heretofore it has been thought that semi-flexible foams were necessary. The polyurethane compositions produced by this invention can be used in all of those applications in which polyurethane compositions are employed.

The polyurethane foams of this invention were tested by the following procedures:

Density—ASTM D-1564-59W
Tensile—ASTM D-1564-59T
Elongation—ASTM D-1564-59T
Indentation—Using a 4 x 4 x 1 inch specimen and a Model TM Instrom machine.
Yield point and yield load—Using a Model TM Instrom.
Ball rebound—ASTM D-1564-59 through 64.

As used in this application, the term "polyol" embraces all of the compounds suitable for use in the production of polyurethanes, i.e., compounds having a reactive hydrogen atom by the Zerewitinoff method, including, but not limited to those specifically set forth herein.

The following examples further serve to illustrate the invention but are not to be construed as restricting it in any manner whatsoever. Parts are by weight unless otherwise specified.

EXAMPLE 1

A dry polymerization flask was charged with 50 parts of an 80/20 isomeric mixture of 2,4- and 2,6-tolylene diisocyanate, 25 parts of styrene and 0.25 part of alpha, alpha-azo-bisisobutyronitrile. The flask was capped, heated for 24 hours in a water bath at 65° C. and then for 72 hours at 50° C. At the end of this reaction period, there was recovered a slightly colored polystyrene/tolylene diisocyanate composition having a 33.3 percent polymer content and a viscosity similar to that of glycerine. The composition had an equivalent weight of 138.5 and $n_D^{30}$ 1.5723.

In a similar manner the following polymer/iso-[thio]-cyanate compositions can be produced; all of them useful in the production of polyurethane compositions:

polystyrene/tolylene diisothiocyanate,
polystyrene/xylylene-1,4-diisothiocyanate,
polystyrene/butylidene diisocyanate,
polyvinyl chloride/tolylene diisothiocyanate,
polyvinylidene chloride/tolylene diisothiocyanate,
poly ethyl acrylate/tolylene diisothiocyanate,
polyisoprene/tolylene diisothiocyanate,
poly(butadiene/styrene)/tolylene diisothiocyanate,
poly(acrylonitrile/vinyl chloride)/tolylene diisothiocyanate
poly(acrylonitrile/vinyl chloride/vinylidene chloride)/tolylene diisothiocyanate.

EXAMPLE 2

A stirrer-equipped flask was charged with 450 parts of the isomeric mixture of tolylene diisocyanate and 0.8 part of alpha, alpha-azo-bis-isobutyronitrile and the contents were then heated to 50° C. Over a five hour period 80 parts of acrylonitrile was added in a dropwise manner and the solution was stirred at 50° C. to 58° C. for another ten hours. After adding 100 parts of tolylene diisocyanate the solution was vacuum distilled and 20 parts of unreacted acrylonitrile was removed. The polyacrylonitrile/tolylene diisocyanate was a homogeneous, light tan solution having a polymer content of 9.6 percent, a viscosity of 939 centipoises (determined with a Brookfield Synchro-Lectric viscometer) and an equivalent weight of 98.2.

EXAMPLE 3

To a stirrer-equipped flask containing 25 parts of the isometric mixture of tolylene diisocyanate there was charged a mixture of two polymerizable monomers, 12.5 parts each of styrene and bis(2-isocyanatoethyl) fumarate. The resulting mixture was stirred until a solution was obtained and then 0.5 part of alpha, alpha-azo-bis-isobutyronitrile was added. The temperature was raised to 65° C. and the reaction mixture was stirred at this temperature for 7.5 hours. The poly[styrene/bis(2-isocyanatoethyl)fumarate]/tolylene diisocyanate product produced was a viscous, fluid composition having a polymer content of 50 percent. In this composition the isocyanato groups in both of the isocyanates are unreacted; copolymerization of the fumarate takes place across the double bond thereof.

EXAMPLES 4 TO 15

In a manner similar to that described in Example 3, a series of poly[styrene/bis(2-isocyanatoethyl)fumarate]/tolylene diisocyanate compositions were produced. The products obtained, however, were vacuum distilled to remove small amounts of unreacted styrene. Infrared spectra of the products of Examples 5 to 15 supported the presence of the —NCO group at 4.35 micron, ester carbonyl at 5.6 and 5.75 microns, aromatic —C═C— at 6.6 and 6.9 microns, and a maximum peak at 6.25 microns found in polystyrene. The reaction conditions and results are tabulated below; all reactions being carried out at 100° C. for a reaction period of about 6 hours.

TABLE A

| Example | 4 | 5 | 6 | 7 | 8 | 9 | 10 | 11 | 12 | 13 | 14 | 15 |
|---|---|---|---|---|---|---|---|---|---|---|---|---|
| Tolylene diisocyanate, pts | 50 | 400 | 50 | 50 | 50 | 33.4 | 75 | 16.6 | 36.4 | 40.6 | 61.4 | 41 |
| Stryene, pts | 25 | 150 | 25 | 37.5 | 43.8 | 25 | 25 | 25 | 11.4 | 15.6 | 36.4 | 25 |
| Bis(2-isocyanatoethyl)-fumarate, pts | 25 | 150 | 25 | 25 | 25 | 25 | 25 | 25 | 25 | 25 | 25 | 25 |
| Benzoyl peroxide, pts | 1 | 7 | 1 | 1.1 | 1.2 | 1 | 1 | 1 | 0.73 | 0.81 | 1.23 | 1 |
| Yield, pts | 97 | 670 | 92 | 103 | 102 | 78 | 102 | 66 | 69 | 75 | 114 | 83 |
| Polymer content, percent | 48.5 | 42.9 | 48.3 | 55.6 | 58.0 | 59.4 | 39.3 | 75.0 | 49.2 | 48.6 | 48.2 | 54.0 |
| Viscosity, cps.×10⁻³ | | 4.94 | 18.6 | 60.7 | 145 | >200 | 8.1 | | 18.4 | 22.0 | 20.5 | 100.6 |
| Reduced viscosity | | 0.099 | 0.1485 | 0.091 | 0.149 | | 0.0497 | 0.174 | 0.058 | 0.167 | 0.283 | 0.171 |
| Equivalent weight | 135 | 128 | 132 | 145 | 151 | 151 | 129 | | 121 | 123 | 136 | 135 |
| $N_D^{30}$ | | 1.5630 | 0.5621 | 1.5658 | 1.5682 | 1.5624 | 1.5623 | | 1.5550 | 1.5574 | 1.5662 | 1.5636 |

EXAMPLE 16

In a manner similar to that described in Example 1, a mixture of 14.5 parts of vinyl chloride and 12.5 parts of bis(2-isocyanatoethyl) fumarate was copolymerized in 25 parts of the isomeric mixture of tolylene diisocyanate. Polymerization was carried out at 65° C. for 24 hours and at 50° C. for 72 hours using 0.25 part of alpha,alpha-azo-bis-isobutyronitrile as catalyst. The poly[vinyl chloride/bis(2 - isocyantoethyl)fumarate]/tolylene diisocyanate composition produced was a viscous, yellow solution having a 51.8 percent polymer content, an equivalent weight of 132.95 and $n_D^{30}$ of 1.5474. Infrared analysis confirmed the identity of the composition.

EXAMPLE 17

In a manner similar to that described in Example 1, a mixture of 12.5 parts of vinylidene chloride and 12.5 parts of bis(2-isocyanatoethyl) fumarate was copolymerized in 25 parts of the isomeric mixture of tolylene diisocyanate to produce a yellow, viscous poly[vinylidene chloride/bis(2-isocyanatoethyl) fumarate]/tolylene diisocyanate composition. This solution had an equivalent weight of 115.25 and $n_D^{30}$ of 1.5535. The structure was confirmed by infrared analysis.

EXAMPLE 18

In a manner similar to that described in Example 1, a mixture of 12.5 parts of ethyl acrylate and 12.5 parts of bis(2-isocyanatoethyl) fumarate was copolymerized in 25 parts of the isomeric mixture of tolylene diisocyanate to produce a yellow, viscous poly[ethyl acrylate/bis(2-isocyanatoethyl) fumarate]/tolylene diisocyanate composition. This solution had an equivalent weight of 142.65 and $n_D^{30}$ of 1.5259. The structure was confirmed by infrared analysis.

EXAMPLE 19

In a manner similar to that described in Example 1, a mixture of 25 parts of styrene and 25 parts of bis(2-isocyanatoethyl) fumarate was copolymerized in 50 parts of bis(2-isocyanatoethyl) carbonate. Polymerization was carried out at 100° C. for six hours using one part of benzoyl peroxide as catalyst. The poly[styrene/bis(2-isocyanatoethyl) fumarate]/bis(2-isocyanatoethyl) carbonate composition was a clear, water-white solution which had a polymer content of 48.9 percent after a small amount of unreacted styrene had been removed by vacuum distillation. The solution had a viscosity of 49,000 centipoises, a reduced viscosity of 0.076, an equivalent weight of 161.4, and an $n_D^{30}$ of 1.5087. No significant changes in properties were observed after a prolonged storage period in a capped plain glass bottle at ambient atmospheric conditions.

EXAMPLE 20

Two untreated, oak wood boards were painted on one side each with the poly[styrene/bis(2-isocyanatoethyl) fumarate]/tolylene diisocyanate complex product of Example 3. The two boards were clamped together and placed in a 100° C. oven for three hours. After cooling the boards could not be separated by hand. Mechanical force was applied to separate the boards; separation was accomplished by breaking of the wood and not by breaking of the adhesive bond.

EXAMPLE 21

A recipe was prepared comprising:

| | Parts |
|---|---|
| Polyol A' | 100 |
| Emulsifier A | 2 |
| Water | 3.5 |
| TMBDA | 0.1 |
| Stannous octoate | 0.3 |
| Tolylene diisocyanate | 44.6 |

The mixture was stirred and transferred to an open mold as soon as it started to foam. The foam was removable from the mold within a short period of time indicating a rapid and highly efficient curing reaction. The foam produced was used for control purposes and was characterized by the physical properties set forth below. Emulsifier A is an end-blocked polysiloxane-polyoxyalkylene block copolymer conventionally used in such foaming operations, having a total average molecular weight of about 7,000 and disclosed in U.S. 2,804,748 and U.S. 2,917,480. TMBDA is N,N,N',N'-tetramethyl-1,3-butanediamine.

| | |
|---|---|
| Tensile strength, p.s.i. | 16.0 |
| Elongation, percent | 184 |
| Density, lbs./ft.³ | 1.72 |
| Indentation load deflection, p.s.i.: | |
| 25% | .53 |
| 65% | 1.2 |
| 90% | 5.9 |
| Yield point: | |
| Deflection, percent | 4.2 |
| Load, p.s.i. | .40 |
| Ball rebound, percent | 47 |

EXAMPLE 22

A recipe was prepared comprising:

| | Parts |
|---|---|
| Polyol A' | 100 |
| Polystyrene/tolylene diisocyanate composition similar to that of Example 1 | 66.4 |
| Emulsifier A | 2 |
| TMBDA | 0.1 |
| Stannous octoate | 0.3 |
| Water | 3.5 |

The mixture was stirred and transferred to an open mold as soon as it started to foam. The foam was removable from the mold within a short period of time indicating a rapid and highly efficient curing reaction.

The foaming procedures used in Examples 22 to 33 were similar, as were the results. Table B sets forth the reactants and concentrations thereof and Table C summarizes the physical properties of the polyurethane foams produced. The tables also include control runs I (Example 21) and II.

TABLE B

| Ex. | Polyol Type | Polyol Pts. | Isocyanate Type | Isocyanate Pts. | Blowing Agent Type | Blowing Agent Pts. | Emulsifier Type | Emulsifier Pts. | Catalyst Type | Catalyst Pts. |
|---|---|---|---|---|---|---|---|---|---|---|
| 22 | A | 100 | PS/TDI | 66.4 | Water | 3.5 | A' | 2.0 | TMBDA | 0.1 |
| | | | | | | | | | St. Oc | 0.3 |
| 23 | B | 100 | PS/TDI | 70.2 | do | 3.5 | A' | 2.0 | TMBDA | 0.1 |
| | | | | | | | | | St. Oc | 0.3 |
| 24 | A | 100 | PVCN/TDI | 46.3 | do | 3.5 | A' | 2.0 | TMBDA | 0.1 |
| | | | | | | | | | St. Oc | 0.3 |
| 25 | B | 100 | PVCN/TDI | 47.7 | do | 3.5 | A' | 2.0 | TMBDA | 0.1 |
| | | | | | | | | | St. Oc | 0.3 |
| 26 | C | 100 | PS/TDI | 92.4 | FC | 30 | A' | 1.5 | DBTDL | .05 |
| 27 | C | 100 | PS/TDI | 92.6 | FC | 27 | A' | 1.5 | DBTDL | 0.05 |
| 28 | C | 100 | PS/TDI | 92.6 | FC | 33 | A' | 1.5 | DBTDL | 0.05 |
| 29 | D | 100 | PS/TDI | 124.5 | FC | 36 | A' | 1.0 | TEDA | 0.8 |
| 30 | C | 100 | PVCN/TDI | 62.7 | FC | 18 | A' | 1.5 | DBTDL | 0.05 |
| 31 | C | 100 | PVCN/TDI | 62.7 | FC | 22 | A' | 1.5 | DBTDL | 0.05 |
| 32 | C | 100 | PVCN/TDI | 62.7 | FC | 26 | A' | 1.5 | DBTDL | 0.05 |
| 33 | A | 100 | P(VCl/VCl₂)/TDI | | Water | 3.5 | A' | 2 | TMBDA | 0.1 |
| | | | | | | | | | St. Oc | 0.3 |
| 34 | A | 100 | PVCl₂/TDI | | do | 3.5 | A' | 2 | TMBDA | 0.1 |
| | | | | | | | | | St. Oc | 0.3 |
| 35 | B | 100 | PVCl/TDI | | do | 3.5 | A' | 2 | TMBDA | 0.1 |
| | | | | | | | | | St. Oc | 0.3 |
| 36 | A | 100 | PVCl/TDI | | do | 3.5 | A' | 2 | TMBDA | 0.1 |
| | | | | | | | | | St. Oc | 0.3 |
| Control: | | | | | | | | | | |
| I | A | 100 | TDI | 44.6 | do | 3.5 | A' | 2 | TMBDA | 0.1 |
| | | | | | | | | | St. Oc | 0.3 |
| II | B | 100 | TDI | 44.7 | do | 3.5 | A' | 2 | TMBDA | 0.1 |
| | | | | | | | | | St. Oc | 0.3 |

POLYOL TYPES

Polyol A′=Polymer/polyol composition, 20% polyacrylonitrile/80% 1,2-propylene oxide adduct of glycerol having an average molecular weight of 3,000 and a hydroxyl number of 56.

Polyol B=1,2-propylene oxide adduct of glycerol having an average molecular weight of 3,000 and a hydroxyl number of 56.

Polyol C=A mixture of 90 parts of the ethylene oxide and 1,2-propylene oxide adduct of phenol/aniline/formaldehyde polymer having a hydroxyl number of about 320 and 10 parts of the 1,2-propylene oxide adduct of diethylenetriamine having a hydroxyl number of about 700.

Polyol D=Propylene glycol adduct of sorbitol having a hydroxyl number of about 500.

ISOCYANATE TYPES

PS/TDI=A polystyrene/tolylene diisocyanate complex composition containing 36.6% polystyrene polymerized in situ.

PVCN/TDI=A polyacrylonitrile/tolylene dissocyanate complex composition containing 4.83% polyacrylonitrile polymerized in situ.

PVCl/TDI=An in situ polymerized polyvinyl chloride/tolylene diisocyanate complex composition.

PVCl$_2$/TDI=An in situ polymerized polyvinylidene chloride/tolylene diisocynate complex composition.

P(VCl/VCl$_2$)/TDI=An in situ polymerized poly(vinyl chloride/vinylidene chloride)/tolylene diisocyanate complex composition.

TDI=Tolylene diisocyanate.

CATALYST TYPES

TMBDA=N,N,N′,N′-tetramethyl-1,3-butanediamine.
St. Oc.=Stannous octoate.
DBDTL=Dibutyltin dilaurate.
TEDA=Triethylenediamine.
FC=Trichlorofluoromethane.
Emulsifier A=An end blocked polysiloxane-polyoxyalkylene block copolymer.

TABLE C

| Ex. | Rise Time (sec.) | Tensile (p.s.i.) | Elongation (percent) | Density (lbs./ft.$^3$) | Indentation Load Deflection (p.s.i.) | | | Compression, p.s.i., Aged | | |
|---|---|---|---|---|---|---|---|---|---|---|
| | | | | | 25% | 65% | 90% | Cold Dry | Humid | |
| 22 | 140 | 11.7 | 61 | 2.91 | 1.13 | 4.03 | 38.1 | | | |
| 23 | 140 | 10.1 | 108 | 2.52 | 0.61 | 1.84 | 14.5 | | | |
| 24 | 92 | 22.5 | 119 | 1.82 | 1.08 | 2.24 | 11.9 | | | |
| 25 | 117 | 12.5 | 146 | 2.00 | 0.65 | 1.40 | 7.95 | | | |
| 26 | 108 | | | 2.59 | | | | 34.2 | 36.0 | 40.2 |
| 27 | 105 | | | 2.11 | | | | 27.9 | 29.1 | 28.4 |
| 28 | 118 | | | 1.86 | | | | 21.8 | 25.6 | 23.4 |
| 29 | 42 | | | | | | | | | |
| 30 | 65 | | | 2.58 | | | | 56.5 | 56.9 | 55.5 |
| 31 | 65 | | | 2.14 | | | | 40.4 | 40.4 | 39.5 |
| 32 | 65 | | | 1.93 | | | | 33.7 | 35.1 | 32.2 |
| Control: | | | | | | | | | | |
| I | | 16.0 | 184 | 1.72 | 0.53 | 1.2 | 5.9 | | | |
| II | 91 | 12.0 | 117 | 1.73 | 0.75 | 1.48 | 7.66 | | | |

What is claimed is:

1. A complex composition selected from the group consisting of polymer/organic isocyanate complex and polymer/organic isothiocyanate complex composition consisting essentially of an organic isocyanate compound selected from the group consisting of a low molecular weight organic isocyanate and organic isothiocyanate and catalytically polymerized therein at a temperature of from about 0° C. to about 250° C. and in contact with from about 0.001 to about 5 weight percent of a free radical catalyst a polymer of a polymerizable monomer, said monomer being free of reactive hydrogen atoms according to the Zerewitinoff test and having at least one polymerizable aliphatic ethylenic unsaturated group and said isocyanate compound being free of polymerizable aliphatic ethylenic unsaturation.

2. A method for producing polyurethane comprising reacting (a) a polyol having reactive hydrogen atoms according to the Zerewitinoff test and (b) a complex composition selected from the group consisting of polymer/organic isocyanate complex and polymer/organic isothiocyanate complex composition consisting essentially of an organic isocyanate compound selected from the group consisting of an organic isocyanate and an organic isothiocyanate and catalytically polymerized therein at a temperature of from about 0° C. to about 250° C. and in contact with from about 0.001 to about 5 weight percent of a free radical catalyst a polymer of a polymerizable monomer, said monomer being free of reactive hydrogen atoms according to the Zerewitinoff test and having at least one polymerizable aliphatic ethylenic unsaturated group and said isocyanate compound being free of polymerizable aliphatic ethylenic unsaturation.

3. A complex composition selected from the group consisting of polymer/organic isocyanate complex and polymer/organic isothiocyanate complex composition consisting essentially of an organic isocyanate compound selected from the group consisting of a low molecular weight organic isocyanate and organic isothiocyanate and catalytically polymerized therein at a temperature of from about 0° C. to about 250° C. and in contact with from about 0.001 to about 5 weight percent of a free radical catalyst from about 1 to about 90 weight percent of a polymer of a polymerizable monomer, said monomer being free of reactive hydrogen atoms according to the Zerewitinoff test and having at least one polymerizable aliphatic ethylenic unsaturated group and said isocyanate compound being free of polymerizable aliphatic ethylenic unsaturation.

4. A method for producing polyurethane comprising reacting (a) a polyol having reactive hydrogen atoms according to the Zerewitinoff test and (b) a complex composition selected from the group consisting of polymer/organic isocyanate complex and polymer/organic isothiocyanate complex composition consisting essentially of an organic isocyanate compound selected from the group consisting of an organic isocyanate and an organic isothiocyanate and catalytically polymerized therein at a temperature of from about 0° C. to about 250° C. and in contact with from about 0.001 to about 5 weight percent of a free radical catalyst from about 1 to about 90 weight percent of a polymer of a polymerizable monomer, said monomer being free of reactive hydrogen atoms according to the Zerewitinoff test and having at least one polymerizable aliphatic ethylenic unsaturated group and said isocyanate compound being free of polymerizable aliphatic ethylenic unsaturation.

5. A complex composition selected from the group consisting of polymer/organic isocyanate complex and polymer/organic isothiocyanate complex composition consisting essentially of an organic isocyanate compound selected from the group consisting of a low molecular weight organic isocyanate and organic isothiocyanate and catalytically polymerized therein at a temperature of from about 0° C. to about 250° C. and in contact with from about 0.001 to about 5 weight percent of a free radical catalyst from about 10 to about 50 weight percent of a polymer of a polymerizable monomer, said monomer being free of reactive hydrogen atoms according to the Zerewitinoff test and having at least one polymerizable aliphatic ethylenic unsaturated group and said isocyanate compound being free of polymerizable aliphatic ethylenic unsaturation.

6. A method for producing polyurethane comprising reacting (a) a polyol having reactive hydrogen atoms according to the Zerewitinoff test and (b) a complex composition selected from the group consisting of polymer/organic isocyanate complex and polymer/organic isothiocyanate complex composition consisting essentially of an organic isocyanate compound selected from the group consisting of an organic isocyanate and an organic isothiocyanate and catalytically polymerized therein at a temperature of from about 0° C. to about 250° C. and in contact with from about 0.001 to about 5 weight percent of a free radical catalyst from about 10 to about 50 weight percent of a polymer of a polymerizable monomer, said monomer being free of reactive hydrogen atoms according to the Zerewitinoff test and having at least one polymerizable alpihatic ethylenic unsaturated group and said isocyanate compound being free of polymerizable aliphatic ethylenic unsaturation.

7. A complex composition selected from the group consisting of polymer/organic isocyanate complex and polymer/organic isothiocyanate complex composition consisting essentially of an organic isocyanate compound selected from the group consisting of a low molecular weight organic isocyanate and organic isothiocyanate and catalytically polymerized therein at a temperature of from about 0° C. to about 250° C. and in contact with from about 0.001 to about 5 weight percent of a free radical catalyst from about 1 to about 90 weight percent styrene and said isocyanate compound being free of polymerizable aliphatic ethylenic unsaturation.

8. The polymer complex of claim 7 wherein the isocyanate is tolylene diisocyanate.

9. A method for producing polyurethane comprising reacting (a) a polymer/polyol complex composition consisting essentially of a polyol and catalytically polymerized therein acrylonitrile said complex having a reactive hydrogen atom according to the Zerewitinoff test and (b) a polystyrene/tolylene diisocyanate complex composition as claimed in claim 8.

10. A method for producing polyurethane comprising reacting (a) a polyol having reactive hydrogen atoms according to the Zerewitinoff test and (b) a polystyrene/tolylene diisocyanate complex composition as claimed in claim 8.

11. A method for producing polyurethane comprising reacting (a) a polyol having reactive hydrogen atoms according to the Zerewitinoff test and (b) a polystyrene/organic isocyanate complex composition consisting essentially of an organic isocyanate and catalytically polymerized therein at a temperature of from about 0° C. to about 250° C. and in contact with from about 0.001 to about 5 weight percent of a free radical catalyst from about 1 to about 90 weight percent styrene and said isocyanate compound being free of polymerizable aliphatic ethylenic unsaturation.

12. A polyacrylonitrile/organic isocyanate complex composition consisting essentially of an organic isocyanate and polymerized therein at a temperature of from about 0° C. to about 250° C. and in contact with from about 0.001 to about 5 weight percent of a free radical catalyst from about 1 to about 90 weight percent acrylonitrile and said isocyanate compound being free of polymerizable aliphatic ethylenic unsaturation.

13. The polymer complex of claim 12 wherein the isocyanate is tolylene diisocyanate.

14. A method for producing polyurethane comprising reacting (a) a polyol having reactive hydrogen atoms according to the Zerewitinoff test and (b) a polyacrylonitrile/tolylene diisocyanate complex composition as claimed in claim 13.

15. A method for producing polyurethane comprising reacting (a) a polyol having reactive hydrogen atoms according to the Zerewitinoff test and (b) a polyacrylonitrile/organic isocyanate complex composition consisting essentially of an organic isocyanate and catalytically polymerized therein at a temperature of from about 0° C. to about 250° C. and in contact with from about 0.001 to about 5 weight percent of a free radical catalyst from about 1 to about 90 weight percent acrylonitrile and said isocyanate compound being free of polymerizable aliphatic ethylenic unsaturation.

16. A poly[styrene/bis(2-isocyanatoethyl) fumarate]/organic isocyanate complex composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of styrene and bis(2-cyanatoethyl) fumarate and said isocyanate compound being free of polymerizable aliphatic ethylenic unsaturation.

17. The polymer complex of claim 16 wherein the isocyanate is tolylene diisocyanate.

18. A method for producing polyurethane comprising reacting (a) a polyol having reactive hydrogen atoms according to the Zerewitinoff test and (b) a poly[styrene/bis(2-isocyanatoethyl) fumarate]/tolylene diisocyanate complex composition as claimed in claim 17.

19. The polymer complex of claim 16 wherein the isocyanate is bis(2-isocyanatoethyl) carbonate.

20. A method for producing polyurethane comprising reacting (a) a polyol having reactive hydrogen atoms according to the Zerewitinoff test and (b) a poly[styrene/bis(2-isocyanatoethyl) fumarate]/bis(2-isocyanatoethyl) carbonate complex composition as claimed in claim 17.

21. A method for producing polyurethane comprising reacting (a) a polyol having reactive hydrogen atoms according to the Zerewitinoff test and (b) a poly[styrene/bis(2-isocyanatoethyl) fumarate]/organic isocyanate composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of styrene and bis(2-isocyanatoethyl) fumarate and said isocyanate compound being free of polymerizable aliphatic ethylenic unsaturation.

22. A poly[vinyl chloride/bis(2-isocyanatoethyl) fumarate]/organic isocyanate complex composition consisting essentially of an organic isocyanate and copolymerized therein at a temperature of from about 0° C. to about 250° C. and in contact with from about 0.001 to about 5 weight percent of a free radical catalyst from about 1 to about 90 weight percent of vinyl chloride and bis(2-isocyanatoethyl) fumarate and said isocyanate compound being free of polymerizable aliphatic ethylenic unsaturation.

23. The polymer complex of claim 22 wherein tne isocyanate is tolylene diisocyanate.

24. A method for producing polyurethane comprising reacting (a) a polyol having reactive hydrogen atoms according to the Zerewitinoff test and (b) a poly[vinyl chloride/bis(2-isocyanatoethyl) fumarate]/tolylene diisocyanate complex composition as claimed in claim 23.

25. A method for producing polyurethane comprising reacting (a) a polyol having reactive hydrogen atoms according to the Zerewitinoff test and (b) a poly[vinyl chloride/bis(2-isocyanatoethyl) fumarate]/organic isocyanate complex composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of vinyl chloride and bis(2-isocyanatoethyl) fumarate and said isocyanate compound being free of polymerizable aliphatic ethylenic unsaturation.

26. A poly[vinylidene chloride/bis(2-isocyanatoethyl) fumarate]/organic isocyanate complex composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of vinylidene chloride and bis(2-isocyanatoethyl) fumarate and said isocyanate compound being free of polymerizable aliphatic ethylenic unsaturation.

27. The polymer complex of claim 26 wherein the isocyanate is tolylene diisocyanate.

28. A method for producing polyurethane comprising reacting (a) a polyol having reactive hydrogen atoms according to the Zerewitinoff test and (b) a poly[vinylidene chloride/bis(2-isocyanatoethyl) fumarate]/tolylene diisocyanate complex composition as claimed in claim 27.

29. A method for producing polyurethane comprising reacting (a) a polyol having reactive hydrogen atoms according to the Zerewitinoff test and (b) a poly[vinylidene chloride/bis(2-isocyanatoethyl) fumarate]/organic isocyanate complex composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of vinylidene chloride and bis(2-isocyanatoehtyl) fumarate and said isocyanate compound being free of polymerizable alpihatic ethylenic unsaturation.

30. A poly[2 - ethylhexylacrylate/bis(2 - isocyanatoethyl) fuamarate]/organic isocyanate complex composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of 2-ethylhexyl acrylate and bis(2-isocyanatoethyl) fumarate and said isocyanate compound being free of polymerizable aliphatic ethylenic unsaturation.

31. The polymer complex of claim 30 wherein the isocyanate is tolylene diisocyanate.

32. A method for producing polyurethane comprising reacting (a) a polyol having reactive hydrogen atoms according to the Zerewitinoff test and (b) a poly[2-ethylhexyl acrylate/bis(2-isocyanatoethyl) fumarate]/tolylene diisocyanate complex composition as claimed in claim 31.

33. A method for producing polyurethane comprising reacting (a) a polyol having reactive hydrogen atoms according to the Zerewitinoff test and (b) a poly[2-ethylhexyl acrylate/bis(2-isocyanatoethyl) fumarate]/organic isocyanate complex composition consisting essentially of an organic isocyanate and catalytically copolymerized therein at a temperature of from about 0° C. to about 250° C. and in contact with from about 0.001 to about 5 weight percent of a free radical catalyst from about 1 to about 90 weight percent of 2-ethylhexyl acrylate and bis (2-isocyanatoethyl) fumarate and said isocyanate compound being free of polymerizable aliphatic ethylenic unsaturation.

References Cited

UNITED STATES PATENTS

| | | | |
|---|---|---|---|
| 2,326,287 | 8/1943 | Coffman | 260—84 |
| 2,647,884 | 8/1953 | Wystrach | 260—47 |
| 3,038,876 | 6/1962 | Farago | 260—859 |
| 3,086,952 | 4/1963 | Newton | 260—32.8 |
| 3,162,664 | 12/1964 | Brotherton et al. | 260—77.5 |
| 3,225,119 | 12/1965 | Baker | 260—874 |
| 3,275,679 | 9/1966 | Brotherton et al. | 260—475 |
| 3,210,439 | 10/1965 | Aitken et al. | 260—859 |
| 3,272,890 | 9/1966 | O'Leary | 260—859 |
| 3,304,273 | 2/1967 | Stamberger | 260—2.5 |
| 3,357,939 | 12/1967 | Reischl et al. | 260—30.6 |
| 3,358,052 | 12/1967 | Archer et al. | 260—859 |

FOREIGN PATENTS

| | | |
|---|---|---|
| 684,678 | 12/1952 | Great Britain. |
| 1,337,619 | 8/1953 | France. |
| 859,812 | 1/1961 | Great Britain. |
| 643,340 | 5/1964 | Belgium. |
| 743,620 | 9/1966 | Canada. |
| 757,698 | 4/1967 | Canada. |
| 1,022,434 | 3/1966 | Great Britain. |
| 1,152,536 | 8/1963 | Germany. |
| 1,152,537 | 8/1963 | Germany. |

DONALD E. CZAJA, *Primary Examiner.*

F. E. McKELVEY, *Assistant Examiner.*

U.S. Cl. X.R.

260—51.5, 77.5, 59, 75, 47, 844, 2.5, 63; 117—161; 161—190; 260—30.8, 32.4

UNITED STATES PATENT OFFICE
CERTIFICATE OF CORRECTION

Patent No. 3,422,165                                         January 14, 1969

Thomas K. Brotherton et al.

It is certified that error appears in the above identified patent and that said Letters Patent are hereby corrected as shown below:

Column 16, line 35, claim reference numeral "17" should read -- 19 --.

Signed and sealed this 17th day of March 1970.

(SEAL)
Attest:

Edward M. Fletcher, Jr.                          WILLIAM E. SCHUYLER, JR.
Attesting Officer                                        Commissioner of Patents